United States Patent [19]

Vary et al.

[11] 4,118,537

[45] Oct. 3, 1978

[54] FLUOROCARBON POLYMER COATINGS

[75] Inventors: Eva M. Vary, Wynnewood, Pa.; Eustathios Vassiliou, Newark, Del.

[73] Assignee: E. I. Du Pont de Nemours and Company, Wilmington, Del.

[21] Appl. No.: 785,450

[22] Filed: Apr. 7, 1977

Related U.S. Application Data

[63] Continuation-in-part of Ser. No. 636,845, Dec. 2, 1975, abandoned, which is a continuation-in-part of Ser. No. 525,672, Nov. 20, 1974, abandoned, which is a continuation-in-part of Ser. No. 405,799, Oct. 12, 1973, abandoned.

[51] Int. Cl.$^2$ .............................................. B32B 27/00
[52] U.S. Cl. .............................. 428/422; 260/29.6 F; 260/900; 427/216; 427/226; 427/409; 428/463; 428/421; 260/29.6 RB; 260/29.6 RW
[58] Field of Search ............... 428/422, 421, 262, 463; 427/385 R, 327, 216, 226, 409, 435; 260/29.6 F, 29.6 RB, 29.6 RW, 900

[56] References Cited

U.S. PATENT DOCUMENTS

| 2,681,324 | 6/1954 | Hochberg | 428/463 |
|---|---|---|---|
| 3,093,264 | 6/1963 | Fitzharris | 428/421 |
| 3,340,216 | 9/1967 | Mack | 428/421 |
| 3,393,086 | 7/1968 | Keating | 428/422 |
| 3,489,595 | 1/1970 | Brown | 428/422 |
| 3,526,532 | 9/1970 | Heiberger | 428/421 |
| 3,644,261 | 2/1972 | Strolle | 260/29.6 F |
| 3,655,604 | 3/1972 | Strolle | 428/422 |
| 3,694,392 | 9/1972 | Werner | 260/29.6 F |
| 3,986,993 | 10/1976 | Vassiliou | 428/422 |
| 4,011,361 | 3/1977 | Vassiliou | 428/422 |

Primary Examiner—Ellis Robinson

[57] ABSTRACT

Coating compositions containing
  (a) a fluorocarbon polymer and
  (b) a polymer which depolymerizes, and whose depolymerization products vaporize, at the fluorocarbon polymer fusion temperature, when applied to cookware over certain primers containing colloidal silica, give films with greater density and less porosity than conventional fluorocarbon polymer compositions.

17 Claims, No Drawings

FLUOROCARBON POLYMER COATINGS

CROSS-REFERENCE TO RELATED APPLICATIONS

This application is a continuation-in-part of application Ser. No. 636,845, filed Dec. 2, 1975 now abandoned, which in turn is a continuation-in-part of application Ser. No. 525,672, filed Nov. 20, 1974 now abandoned, which is a continuation-in-part of application Ser. No. 405,799, filed Oct, 12, 1973 now abandoned.

BACKGROUND OF THE INVENTION

Cookware coated with fluorocarbon polymers of various sorts has come into widespread use in recent years. Many housewives prefer to use such cookware in their kitchens because food is less likely to stick to it and because it is so easy to clean.

It has now been found, according to this invention, that the fluorocarbon polymer film which coats such cookware can be made denser and less porous that it was previously, and that this makes the product still easier to clean and improves its appearance by making the film glossier.

SUMMARY OF THE INVENTION

One can get these advantages by using, instead of the customary fluorocarbon polymer cookware enamel, a topcoat composition which contains as its principal ingredients a fluorocarbon polymer, a polymeric adjunct having specific physical properties, and a liquid carrier, applied on top of certain types of primers.

The fluorocarbon polymers used in this topcoat composition are those of hydrocarbon monomers completely substituted with fluorine atoms or a combination of fluorine atoms and chlorine atoms. Included in this group are polytetrafluoroethylene (PTFE), copolymers of tetrafluoroethylene and hexafluoropropylene in all monomer unit weight ratios (FEP) and fluorochlorocarbon polymers such as polymonochlorotrifluoroethylene. PTFE is preferred because of the excellence of the products it gives.

The fluorocarbon polymers used are particulate. When the topcoat compositions are applied by spraying, the particles should preferably be small enough to pass through the nozzle of a spray gun without clogging it and also small enough to give the resulting film integrity. In most cases this means the particles should be no larger than about 0.35 micron in the longest dimension, measured optically against a standard.

The fluorocarbon polymer is ordinarily present in this composition at a concentration of about 25% to about 95% (by weight) of the total of fluorocarbon polymer and adjunct polymer solids, preferably about 85% to about 95%, even more preferably about 85% to about 89%.

Broadly speaking, the polymeric adjunct can be any polymer or copolymer (in the sense of being composed of two or more types of monomers) of monoethylenically unsaturated monomers which depolymerizes, and whose depolymerization products vaporize, in the temperature range of from about 150° C. below the fusion temperature of the fluorocarbon polymer used to about the fluorocarbon polymer's decomposition temperature. The closer the depolymerization and vaporization temperatures are to the fluorocarbon's fusion temperature, the better. "Depolymerization" means degradation of the polymer to the point at which the degradation products are volatile at the temperatures encountered in curing the film. These degradation products can be monomers, dimers or oligomers.

"Vaporization" means volatization of the degradation products and their evaporation from the film. Ideally, all of the degradation products pass from the film, but as a practical matter, a small but insignificant amount generally remains.

Illustrative of the polymeric adjuncts which can be used are polymers of one or more monoethylenically unsaturated monomers which polymers also contain one or more monoethylenically unsaturated acid units.

Representative of these monoethylenically unsaturated monomers are alkyl acrylates and alkyl methacrylates having 1–8 carbon atoms in the alkyl group, styrene, α-methyl styrene and vinyl toluene. Representative of the monoethylenically unsaturated acids are acrylic acid, methacrylic acid, fumaric acid, itaconic acid and maleic acid (or anhydride). Alkyl acrylates and methacrylates and acrylic and methacrylic acids are preferred for the density and gloss of the finishes obtained when they are used. The acid units can comprise up to about 20% of the total weight of the polymer.

The acid units of these polymers can optionally be esterified with glycidyl esters of 4–14 carbon atoms (total).

The preferred glycidyl ester is one derived from a product sold by the Shell Chemical Company as "Cardura E" ester. This is a mixed ester of the general formula

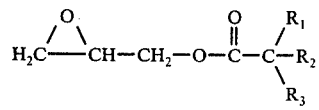

where
$R_1$ is $CH_3$
and
$R_2$ and $R_3$ are lower alkyl groups,
$R_1$, $R_2$ and $R_3$ containing a total of 7–9 carbon atoms.

The polymeric adjuncts especially preferred for use are 1. methyl methacrylate/2-ethylhexyl acrylate/methacrylic acid terpolymers, preferably the 40-50/48-52/1-4 (weight ratio) terpolymers;
2. butyl acrylate/methyl methacrylate/acrylic acid terpolymers esterified with "Cardura E", the units preferably present in a 23-27/33-37/15-19/21-25 ratio;
3. styrene/methyl methacrylate/acrylic acid terpolymers esterified with "Cardura E", the units preferably present in a 28-32/8-32/15-19/21-25 ratio;
4. methyl methacrylate/ethyl acrylate/methacrylic acid terpolymers, preferably the 37-41/55-59/1-6 terpolymers.

The polymeric adjunct is ordinarily present in the composition at a concentration of from about 5% through about 75% (by weight) of the total of fluorocarbon polymer and adjunct polymer solids, preferably about 5% through about 15%, even more preferably about 11% through about 15%.

These polymeric adjuncts can be made by any of the conventional polymerization and esterification techniques familiar to any polymer chemist.

The carrier used in the topcoat composition can be any of those normally used in compositions of this type.

It is an inert, not a reactive or functional (in the sense of contributing to the working of the invention) component and its nature is therefore, generally speaking, of secondary importance. The carrier serves only to keep the composition homogeneous, and acts as a mechanism for conveying the solid components to the substrate. After a coating has been deposited, the carrier evaporates. It is necessary, therefore, only that it be compatible with the other components of the composition and that it have no adverse effects on the coating itself.

Commonly, the fluorocarbon polymer used in the topcoat composition is provided in the form of an aqueous dispersion, and the water introduced into the composition with the polymer also serves as the carrier for the composition. Organic liquids such as ethanol, isopropanol, acetone and cellosolves, and mixtures of these, can also be used as carriers.

The topcoat composition can also contain such conventional additives as pigments, fillers, flow control agents, plasticizers, etc., as seem necessary or desirable. These additives are added for the usual reasons, in the usual ways and in the usual amounts.

The topcoat composition is made by first choosing the fluorocarbon polymer, polymeric adjunct, liquid carrier and such conventional additives as may be used, and the amounts of these best suited to the purpose. This can be done with no trouble by one skilled in this art. Preparation of the composition is then a simple matter of thoroughly mixing these components.

The topcoat composition will be most useful for topcoating metal cookware, especially frypans, but can be used just as well on other metal articles requiring lubricious surfaces, such as bearings, valves, wire, metal foil, boilers, pipes, ship bottoms, oven liners, iron soleplates, waffle irons, ice cube trays, snow shovels and plows, chutes, conveyors, dies, tolls such as saws, files and drills, hoppers and other industrial containers and molds.

The topcoat composition can be applied in any of the usual ways. Spraying, roller-coating, dipping, doctor-blading—all are suitable, although spraying is generally the method of choice.

The article to be coated is first preferably pre-treated by grit-blasting, by the flame-spraying of metals or by frit-coating. It is then primed with a composition of the type disclosed in U.S. Pat. Nos. 3,655,604; 3,986,993; or 4,011,361. Such a composition contains fluorocarbon polymer, colloidal silica stabilized with ammonium or sodium ions, and a liquid carrier. The disclosures in the aforementioned U.S. patents are incorporated into this specification to show how such primer compositions are made and how they are applied. The article can also be primed with a composition of the type disclosed in U.S. application Ser. No. 588,006, filed June 18, 1975, and now abandoned.

The colloidal silica used in the primer composition is generally in the form of an aqueous sol of silica particles. The colloidal silica is made up of discreet spheroidal particles of silica having no detectable crystallinity. Some surface silica atoms may be replaced by aluminum atoms, and ammonium or sodium ions may be used to stabilize the sol, as is known in the art. Typically, particles have a size in the range of 5-100 millimicrons, preferably 7-25 millimicrons as measured optically against a standard, with a specific surface area of 125-140 square meters per gram and a pH of 8.4-9.9 at 25° C. Colloidal silica sols useful with this invention include those sold by E. I. du Pont de Nemours and Company as "Ludox - HS40", "Ludox - HS", "Ludox - LS", "Ludox - SM30", "Ludox - TM", "Ludox - AS" and "Ludox - AM". Mixtures of compatible colloidal silica sols can be used.

Other fluorocarbon primer compositions are not fully satisfactory with the topcoat compositions used in the present invention. For instance, fluorocarbon-containing primers which also contain aluminum borate, aluminum borophosphate, or lithium polysilicate tend to cause blistering with topcoats of the present invention after extensive use in cookware. Although such coatings may be satisfactory for certain purposes, they are not desirable for higher quality products intended to have optimum service lives. Likewise, fluorocarbon-containing primers which include alkyl silicates have significant drawbacks when attempts are made to use them with topcoats of the present invention. Particularly, the alkyl silicates are very subject to hydrolysis which can diminish their utility in such primers. This means their use would require anhydrous organic solvent systems and protection from atmospheric moisture might be necessary.

The topcoat composition of the invention is then applied, preferably to a thickness of about 10-125 microns (dry). The coating can then be air dried and is then baked for about 0.5-30 minutes at a temperature of about 370°-460° C.

Those skilled in this art will be able to practice this invention more easily by first referring to the following illustrative examples. In these examples, all parts and percentages are by weight.

EXAMPLE 1

A representative topcoat coating composition of the invention is made as follows:

| (1) | Mix together | | |
| | PTFE dispersion | | |
| | aqueous, 60% solids | 411 | parts |
| | Water | 72 | parts |
| (2) | Separately mix | | |
| | Triethanolamine | 12 | parts |
| | Oleic acid | 6 | parts |
| | Toluene | 40.2 | parts |
| | Butyl carbitol | 7.2 | parts |
| (3) | Prepare a mill base by mixing and then pebble milling | | |
| | Water | 67 | parts |
| | Channel black | 20 | parts |
| | Sodium polynaphthalene sulfonate | 3 | parts |
| | Aluminum Silicate | 10 | parts |

Thoroughly mix (1) and (2). Then add to this mixture, with stirring, 90 parts of an aqueous dispersion, 40% solids, of a methyl methacrylate/ethyl acrylate/methacrylic acid 39/57/4 (weight ratio) terpolymer. Then blend 37.2 parts of (3) into this mixture, with stirring.

Spray the resulting composition on a frit-coated aluminum pan, primed with a primer of the type shown in U.S. Pat. No. 3,655,604 containing "Ludox - AS30" colloidal silica stabilized with ammonium ions, to a thickness of 20-25 microns (dry). Then bake the pan for 5 minutes at 430° C. The resulting finish will be glossy and dense.

EXAMPLE 2

Repeat Example 1, except in place of the primer of U.S. Pat. No. 3,655,604, use one of the type of U.S. Pat. No. 3,986,993, made as follows:

| (1) | Mix together | | |
|---|---|---|---|
| | PTFE dispersion | | |
| | aqueous, 60% solids | 478.76 | parts |
| | Deionized water | 130.23 | parts |
| | "Ludox AM" colloidal silica sol* aluminum Modified | | |
| | solids in water | 327.18 | parts |
| (2) | Separately mix | | |
| | Triethanolamine | 11.68 | parts |
| | Oleic Acid | 5.84 | parts |
| | Toluene | 34.56 | parts |
| | Butyl carbitol | 13.36 | parts |
| | Silicone solution (Dow Corning DC-801, 60% solids in xylene) | 34.56 | parts |

Add 85.52 parts of (2) to (1) in a small stream over a 2-3 minute period, with stirring. Then add, with stirring,

| TiO$_2$ dispersion (45% solids in water) | 35.46 parts |
|---|---|
| Channel black dispersion (22% solids in water) | 0.85 parts |

Continue stirring for 10-20 minutes.

Spray this composition on a frit-coated aluminum pan as in Example 1, to a thickness of 5-15 microns (dry) and air dry it. Then bake the pan for 5 minutes at 430° C. The resulting finish will be glossy and dense.

Ludox AM is a sodium stabilized colloidal silica having a pH of about 9 at 25° C., and a silica content (calculated as SiO$_2$) of 30%, whose particles are surface-modified with aluminum and have a particulate diameter of 13-14 millimicrons and a specific surface area of 210-230 square meters per gram.

EXAMPLE 3

A primer composition is made according to U.S. Pat. No. 4,011,361 by adding to a vessel in the order stated and mixing:

| 1. | The polyamide acid amine salt solution of Example 1 of U.S. Pat. 4,014,834 (containing 18% of furfuryl alcohol and 10% of N-methyl-pyrolidone) | 151.8 | parts |
|---|---|---|---|
| 2. | Furfuryl alcohol | 15.2 | parts |
| 3. | Deionized water | 520.0 | parts |
| 4. | White pigment dispersion (made by ball-milling a mixture of | | |
| | TiO$_2$ | 46 | parts |
| | Water | 46 parts | |
| | Triethanolamine/ oleic acid mixture 2/1 | 8 | parts) |
| 5. | PTFE dispersion in water (60% solids) | 222.5 | parts |
| 6. | "Ludox AM" colloidal silica | 29.8 parts | |

The resulting composition is sprayed on a grit-blasted aluminum pan to a thickness of 5 microns (dry) and then air-dried.

The primed pan is then coated with the topcoat of Example 1, and the pan is baked for 5 minutes at 400° C. The resulting finish will be glossy and dense.

What is claimed is:

1. An article having a lubricious surface, comprising (A) a primer coat obtained by curing a composition selected from the group
   (i) a composition consisting essentially of
   (a) from about 50% through about 90%, by weight of the total of (a) and (b) solids, of particulate polymer of hydrocarbon monomers completely substituted with fluorine atoms or a combination of fluorine atoms and chlorine atoms;
   (b) from about 10% through about 50%, by weight of the total of (a) and (b) solids, of an ammonia stabilized colloidal silica sol containing about 30% solids and having a pH of 9.6, and
   (c) a liquid carrier.
   (ii) a. 20-90%, by weight of total solids, a particulate fluorocarbon polymer;
   b. 10-80%, by weight of total solids, colloidal silica having a pH of 8.4-9.9 at 25° C., whose particles have a size of 5-100 millimicrons and specific surface area of 125-420 square meters per gram;
   c. 1-10%, by weight of total composition, alkyl benzene;
   d. 1-10%, by weight of total composition, alcohol containing 4 or more carbon atoms, said alcohol being miscible with water;
   e. 0.3-10%, by weight of total composition, fatty acid containing 8 or more carbon atoms;
   f. 1-15%, by weight of total composition, amine having the formula

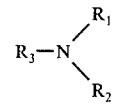

wherein R$_1$ contains 1 to 6 carbon atoms and may contain other functional groups, and R$_2$ and R$_3$ contain one to six carbon atoms or hydrogen; and
   g. a liquid carrier or
   (iii) a. about 10%-90%, by weight of the total of (a) and (b) solids, of a particulate polymer of monoethylenically unsaturated hydrocarbon monomers completely substituted with fluorine atoms or a cominbation of fluorine atoms and chlorine atoms, the polymer having a number average molecular weight of at least 20,000;
   b. about 10%-90%, by weight of the total of (a) and (b) solids, of a binder which comprises
      1. about 5-95%, by weight of the total of (1) and (2) solids, of a colloidal silica which air-dries to form a continuous film when laid down by itself, and
      2. about 5-95%, by weight of the total of (1) and (2) solids, of a salt of a polyamide acid represented by the structure

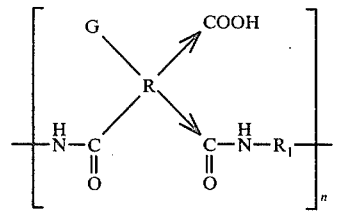

where
G is hydrogen or a carboxyl group; → denotes isomerism;
R is a tetravalent organic radical containing at least two carbon atoms, no more than two carbonyl groups of each polyamide acid unit being attached to any one carbon atom of each tetravalent radical;

R₁ is a divalent radical containing at least two carbon atoms, the amide groups of adjacent polyamide acid units each being attached to separate atoms of said divalent radical; and n is a number large enough to give the polyamide acid an inherent viscosity of at least 0.1, measured as a 0.5% solution in N,N-dimethylacetamide at 30° C.; neutralized with a stoichiometric amount of a tertiary amine;

c. about 10–90%, by weight of the polyamide acid amide salt, of N-methyl pyrrolidone, dimethyl formamide, dimethylacetamide, dimethylsulfoxide, cresylic acid, sulfolane or formamide; and d. a liquid carrier or (iv) a composition comprising particulate fluorocarbon polymer, colloidal silica stabilized with sodium ions, and a liquid carrier; overlaid with (B) a topcoat obtained by curing a composition comprising (1) about 25–95%, by weight of the total of (1) and (2) solids, of a particulate fluorocarbon polymer of hydrocarbon monomers completely substituted with fluorine atoms or a combination of fluorine atoms and chlorine atoms, (2) about 5–75%, by weight of the total of (1) and (2) solids, of a polymer of monoethylenically unsaturated monomers, which polymer depolymerizes, and whose depolymerization products vaporize, in the temperature range of from about 150° C. below the fusion temperature of the fluorocarbon polymer used to about the fluorocarbon polymer's decomposition temperature wherein said polymer contains one or more monoethylenically unsaturated acid units optionally esterified with glycidyl esters of 4–14 carbon atoms (total) and (3) a liquid carrier, at a temperature at which (B)(2) is depolymerized and at which the depolymerization products vaporize.

2. The article of claim 1 wherein the primer coat contains colloidal silica stabilized with ammonium or sodium ions.

3. The article of claim 1 wherein the polymer in (B)(2) is of one or more of an alkyl acrylate or alkyl methacrylate having 1–8 carbon atoms in the alkyl group, styrene, α-methyl styrene or vinyl toluene, and the acid unit is acrylic acid, methacrylic acid, fumaric acid, itaconic acid, maleic acid or maleic anhydride.

4. The article of claim 3 wherein the polymer is a methyl methacrylate/2-ethylhexyl acrylate/methacrylic acid terpolymer.

5. The article of claim 3 wherein the polymer is a butyl acrylate/methyl methacrylate/acrylic acid terpolymer esterified with a mixed ester of the general formula

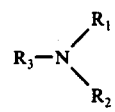

where
R₁ is CH₃ and
R₂ and R₃ are lower alkyl groups,
R₁, R₂ and R₃ containing a total of 7–9 carbon atoms.

6. The article of claim 3 wherein the polymer is a styrene/methyl methacrylate/acrylic acid terpolymer esterified with a mixed ester of the general formula

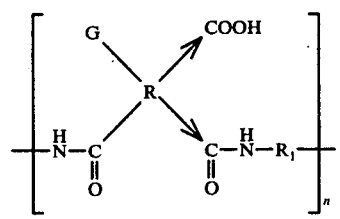

where
R₁ is CH₃ and
R₂ and R₃ are lower alkyl groups,
R₁, R₂ and R₃ containing a total of 7–9 carbon atoms.

7. The article of claim 3 wherein the polymer is a methyl methacrylate/ethyl acrylate/methacrylic acid terpolymer.

8. The article of claim 1 where in (A) and (B)(1) the fluoropolymer is polytetrafluoroethylene.

9. The article of claim 3 where in (A) and (B)(1) the fluoropolymer is polytetrafluoroethylene.

10. The article of claim 4 where in (A) and (B)(1) the fluoropolymer is polytetrafluoroethylene.

11. The article of claim 5 where in (A) and (B)(1) the fluoropolymer is polytetrafluoroethylene.

12. The article of claim 6 where in (A) and (B)(1) the fluoropolymer is polytetrafluoroethylene.

13. The article of claim 7 where in (A) and (B)(1) the fluoropolymer is polytetrafluoroethylene.

14. The article of claim 1 wherein the primer coat is obtained by curing a composition comprising fluorocarbon polymer, colloidal silica stabilized with sodium ions, and a liquid carrier.

15. The article of claim 1 wherein the primer is that of section (A)(i).

16. The article of claim 1 wherein the primer is that of section (A)(ii).

17. The article of claim 1 wherein the primer is that of section (A)(iii).

* * * * *